US011897501B2

(12) United States Patent
Gyllenhammar et al.

(10) Patent No.: US 11,897,501 B2
(45) Date of Patent: Feb. 13, 2024

(54) ADS PERCEPTION DEVELOPMENT

(71) Applicant: Zenseact AB, Gothenburg (SE)

(72) Inventors: Magnus Gyllenhammar, Pixbo (SE);
Carl Zandén, Lindome (SE); Majid Khorsand Vakilzadeh, Mölndal (SE)

(73) Assignee: Zenseact AB

( * ) Notice: Subject to any disclaimer, the term of this patent is extended or adjusted under 35 U.S.C. 154(b) by 0 days.

(21) Appl. No.: 17/741,599

(22) Filed: May 11, 2022

(65) Prior Publication Data
US 2022/0371614 A1 Nov. 24, 2022

(30) Foreign Application Priority Data

May 24, 2021 (EP) ..................................... 21175499

(51) Int. Cl.
*B60W 60/00* (2020.01)
*B60W 40/12* (2012.01)
*G07C 5/00* (2006.01)

(52) U.S. Cl.
CPC .......... *B60W 60/001* (2020.02); *B60W 40/12* (2013.01); *G07C 5/008* (2013.01); *B60W 2420/42* (2013.01); *B60W 2554/4049* (2020.02)

(58) Field of Classification Search
CPC ............... B60W 60/001; B60W 40/12; B60W 2420/42; B60W 2554/4049; G07C 5/008
See application file for complete search history.

(56) References Cited

U.S. PATENT DOCUMENTS

| | | | | |
|---|---|---|---|---|
| 10,732,647 | B2 * | 8/2020 | Shen | G01C 21/1656 |
| 2019/0316913 | A1 * | 10/2019 | Golov | G01C 21/30 |
| 2021/0118245 | A1 * | 4/2021 | Gyllenhammar | G07C 5/008 |
| 2021/0221403 | A1 * | 7/2021 | Gyllenhammar | G05D 1/0276 |

OTHER PUBLICATIONS

Moratuwage, M.D.P., W.S. Wijesoma, B. Kalyan, et al. Collaborative Multi-vehicle Localization and Mapping in Marine Environments, 2010. Accessible at http://hdl.handle.net/1721.1/78631 (Year: 2010).*
EPO Communication and European Search Report dated Nov. 15, 2021 for Patent Application No. 21175499.9, consisting of 7-pages.

* cited by examiner

*Primary Examiner* — Peter D Nolan
*Assistant Examiner* — Tanya C Sienko
(74) *Attorney, Agent, or Firm* — Christopher & Weisberg, P.A.

(57) ABSTRACT

An assessment system for performance evaluation and updating of a PMUD of an ego-vehicle. The assessment system obtains world view data from a perception module configured to generate the world view data based on sensor data obtained from vehicle-mounted sensors; obtains other world view data generated by another perception module; forms a joint world view by matching the world view data the other world view data; and obtains perception data based on a perception model and sensor data obtained from one or more vehicle-mounted sensors. The assessment system further matches the perception data to the formed joint world view; evaluates the obtained perception data in reference to the joint world view to determine an estimation deviation in an identified match between the perceptive parameter of the perception data and a corresponding perceptive parameter in the joint world view; and updates parameters of the perception model based on the estimation deviation.

18 Claims, 6 Drawing Sheets

ADS PERCEPTION DEVELOPMENT

CROSS REFERENCE TO RELATED APPLICATION

This Application is related to and claims priority to European Patent Application No. 21175499.9, filed May 24, 2021, entitled ADS PERCEPTION DEVELOPMENT the entirety of which is incorporated herein by reference.

TECHNICAL FIELD

The present disclosure relates to performance evaluation and updating of a Perception Module Under Development, PMUD, of an ADS-equipped vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Assuring the safety of an ADS is one of the central challenges in being able to release such a system to the market. It is of great importance that an ADS neither exposes its vehicle occupant(s) nor surrounding traffic participants to unacceptable risks. Accordingly, the development of an ADS may be a data and test intensive endeavor, with challenges in terms of managing the immense amounts of data generated by ADS-equipped vehicles in order to develop and verify various ADS features, not only from a data storage, processing and bandwidth perspective, but also from a data security perspective. Furthermore, there are generally significant costs associated with the development and verification of safety of the ADS, especially related to field tests and the understanding of how the system behaves in traffic. Also for a released ADS system it may be paramount to improve the system in a safe and efficient manner, both to achieve cost reductions as well as performance improvements. There is accordingly a need for new solutions for facilitating development and verification of ADSs in order to continuously be able to provide safer and more performant systems. Especially there is a need for an approach facilitating development of ADS-related perception features, in that for development of neural networks or similar type of components commonly used for vision tasks e.g. object detection relevant for ADS-related perception, in order to achieve acceptable and/or desired level of performance, there is generally required extensive amounts of training data which has to be both collected and annotated for subsequent supervised training of such networks.

SUMMARY OF THE INVENTION

It is therefore an object of embodiments herein to provide an approach for supporting development of ADS-related perception in an improved and/or alternative manner. The object above may be achieved by the subject-matter disclosed herein. Embodiments are set forth in the appended claims, in the following description and in the drawings.

The disclosed subject-matter relates to a method performed by an assessment system for performance evaluation and updating of a Perception Module Under Development, PMUD, of an ego-vehicle equipped with an ADS. The assessment system obtains world view data from an ego-vehicle perception module configured to generate the world view data based on sensor data obtained from one or more vehicle-mounted sensors. The assessment system further obtains other world view data generated by an other perception module of at least a first other vehicle in the surrounding environment of the ego-vehicle. Moreover, the assessment system forms a joint world view by matching the world view data and the other world view data in a common reference system. Furthermore, the assessment system obtains perception data from the PMUD, which PMUD is configured to generate the perception data based on a perception model and sensor data obtained from one or more vehicle-mounted sensors, wherein the perception data is indicative of a perceptive parameter of the surrounding environment of the ego-vehicle. The assessment system further matches the perception data to the formed joint world view. Moreover, the assessment system evaluates the obtained perception data in reference to the joint world view in order to determine an estimation deviation in an identified match between the perceptive parameter of the perception data and a corresponding perceptive parameter in the joint world view. Furthermore, the assessment system updates one or more parameters of said perception model based on said estimation deviation.

The disclosed subject-matter further relates to an assessment system for performance evaluation and updating of a PMUD of an ego-vehicle equipped with an ADS. The assessment system comprises a world view obtaining unit for obtaining world view data from an ego-vehicle perception module configured to generate the world view data based on sensor data obtained from one or more vehicle-mounted sensors, an other world view obtaining unit for obtaining other world view data generated by an other perception module of at least a first other vehicle in the surrounding environment of the ego-vehicle, and a joint world view forming unit for forming a joint world view by matching the world view data and the other world view data in a common reference system. The assessment system further comprises a PMUD data obtaining unit for obtaining perception data from the PMUD, which PMUD is configured to generate the perception data based on a perception model and sensor data obtained from one or more vehicle-mounted sensors, wherein the perception data is indicative of a perceptive parameter of the surrounding environment of the ego-vehicle. Moreover, the assessment system comprises a matching unit for matching the perception data to the formed joint world view and an estimation deviation determining unit for evaluating the obtained perception data in reference to the joint world view in order to determine an estimation deviation in an identified match between the perceptive parameter of the perception data and a corresponding perceptive parameter in the joint world view. Furthermore, the assessment system comprises a parameters updating unit for updating one or more parameters of the perception model based on the estimation deviation.

Furthermore, the disclosed subject-matter relates to a vehicle comprising an assessment system as described herein. Moreover, the disclosed subject-matter relates to a computer program product comprising a computer program containing computer program code means arranged to cause a computer or a processor to execute the steps of the assessment system described herein, stored on a computer-readable medium or a carrier wave. The disclosed subject-matter further relates to a non-volatile computer readable storage medium having stored thereon said computer program product.

Thereby, there is introduced an approach enabling and/or supporting efficient development of ADS-related perception and/or perception features. That is, since there is obtained world view data from an ego-vehicle perception module configured to generate the world view data based on sensor data obtained from one or more vehicle-mounted sensors, there is derived data reflecting surroundings as determined by the perception module of the ego-vehicle with support from one or more on-board sensor(s). Furthermore, that is, since there is further obtained other world view data generated by an other perception module of at least a first other vehicle in the surrounding environment of the ego-vehicle, there is derived data reflecting surroundings as determined by a perception module comprised in at least one other vehicle positioned in vicinity of the ego-vehicle. Accordingly, in addition to obtaining data relating to a world view of the ego-vehicle, there is additionally obtained data relating to a world view of at least a first other vehicle near the ego-vehicle, which respective world views—and subsequently respective world view data—then may be assumed to at least partly overlap. Moreover, that is, since there is further formed a joint world view by matching said world view data and said other world view data in a common reference system, world view data not only from the ego-vehicle perception module but also world view data from the perception module of at least one other vehicle in vicinity of the ego-vehicle, may contribute to a combined world view, thus enabling for said combined world view to be enhanced. That is, there is accomplished a more reliable and/or more accurate world view—which may be referred to as a ground truth world view and/or baseline world view—in that contributions to said world view may be provided from more than a single perception module. In other words, by communicating with surrounding vehicles that the ego-vehicle encounters, collective data of the plurality of vehicles can be used to create an enhanced version of the world view in the vicinity of the two vehicles. Furthermore, that is, since there is further obtained perception data from the PMUD, which PMUD is configured to generate the perception data based on a perception model and sensor data obtained from one or more vehicle-mounted sensors, which perception data is indicative of a perceptive parameter of the surrounding environment of the ego-vehicle, there is retrieved data reflecting surroundings as determined by the PMUD as derived from its perception model with support from one or more on-board sensor(s). Moreover, that is, since further the perception data is matched to the formed joint world view, the perception data as provided by the PMUD is compared to and/or overlaid the joint world view as provided by the ego-vehicle perception module and other vehicle perception module(s). In other words, the matching may be construed as a comparison step between the PMUD perception data and the formed joint world view so to identify a level of matching between one or more perceptive parameters—e.g. object positions—in said perception data and a corresponding perceptive parameters in the joint world view. For example, the matching may include comparing the position of an identified object e.g. vehicle in the perception data with the position of that vehicle in the joint worldview. A purpose of the matching is to match an object from the perception data with one object from the joint world view, both corresponding to one unique object in the real world. Furthermore, that is, since further the obtained perception data is evaluated in reference to the joint world view in order to determine an estimation deviation in an identified match between the perceptive parameter of the perception data and a corresponding perceptive parameter in the joint world view, the performance of the PMUD may be assessed. That is, after corresponding objects from the joint world view and the perception data are matched together, their associated perceptive parameter(s)—e.g. positions, speed, heading, etc.—are compared, their difference indicated by said estimation deviation. Moreover, that is, since there is further updated one or more parameters of the perception model based on the determined estimation deviation, an update of perception model software parameters may be locally conducted taking into consideration the estimation deviation, and accordingly there is provided a learning process for various perception features in autonomous driving applications. That is, the herein proposed learning regime relies on a joint world view which provides a baseline and/or ground truth towards which the output of the software and/or hardware under development is compared, thus providing advantages in terms of cost effective and/or time efficient development of perception features for autonomous driving applications, cost effective updates of the hardware platform of the sensor hardware as well as the computational hardware of the ADS, and/or efficient utilization of available resources in vehicles to facilitate the development of perception features. In other words, the present invention provides a time efficient and/or cost effective solution for developing consecutive releases of perception features for autonomous vehicles. Thus, there is supported cost effective development of next generation sensor platform(s)—hardware and/or software—to reduce system cost for future products and/or systems. Further, one may similarly utilize the teachings herein to improve the efficiency of e.g. vision and fusion algorithms to allow for execution on leaner computational hardware and thereby provide additional cost reductions of the hardware platform.

For that reason, an approach is provided for supporting development of ADS-related perception in an improved and/or alternative manner. The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
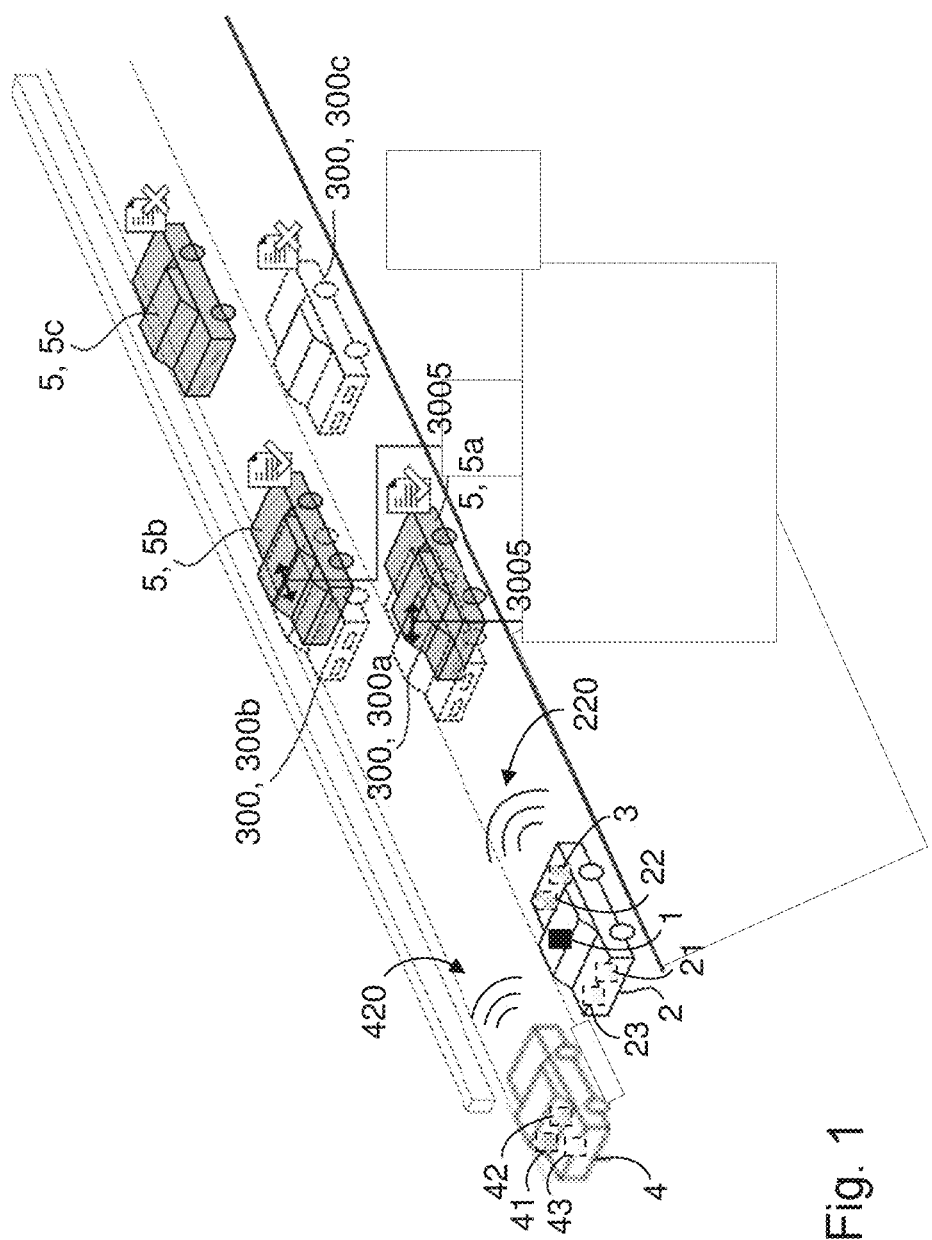
FIG. 1 illustrates a schematic view of an exemplifying first scenario involving an exemplifying assessment system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

Figure 2:
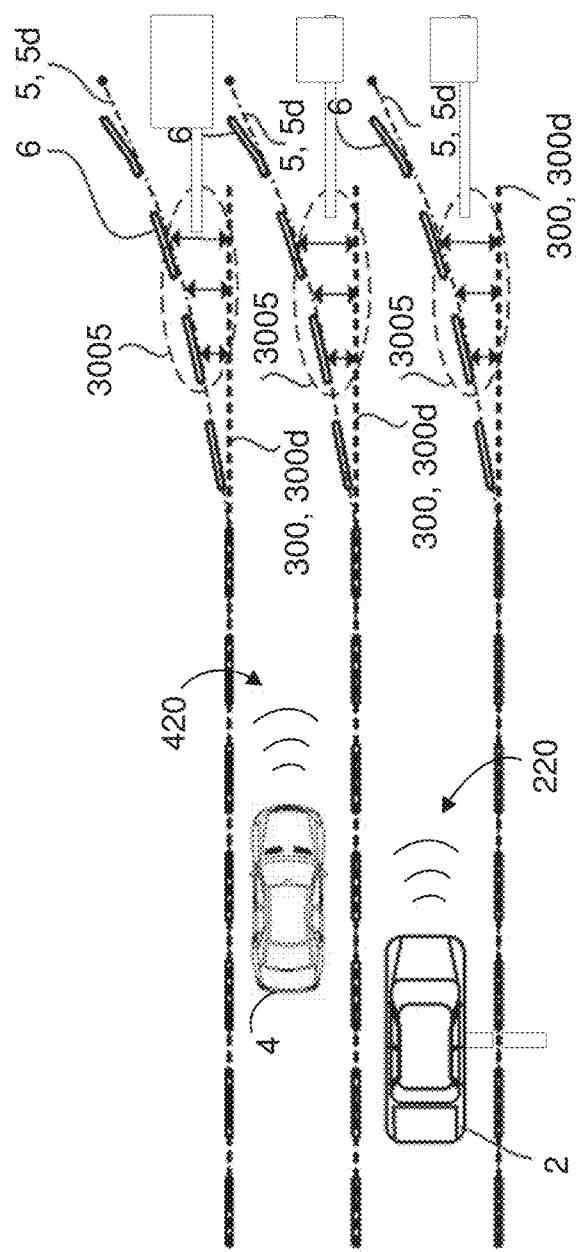
FIG. 2 illustrates a schematic view of an exemplifying second scenario involving an exemplifying assessment system according to embodiments of the disclosure.
Figure 3:
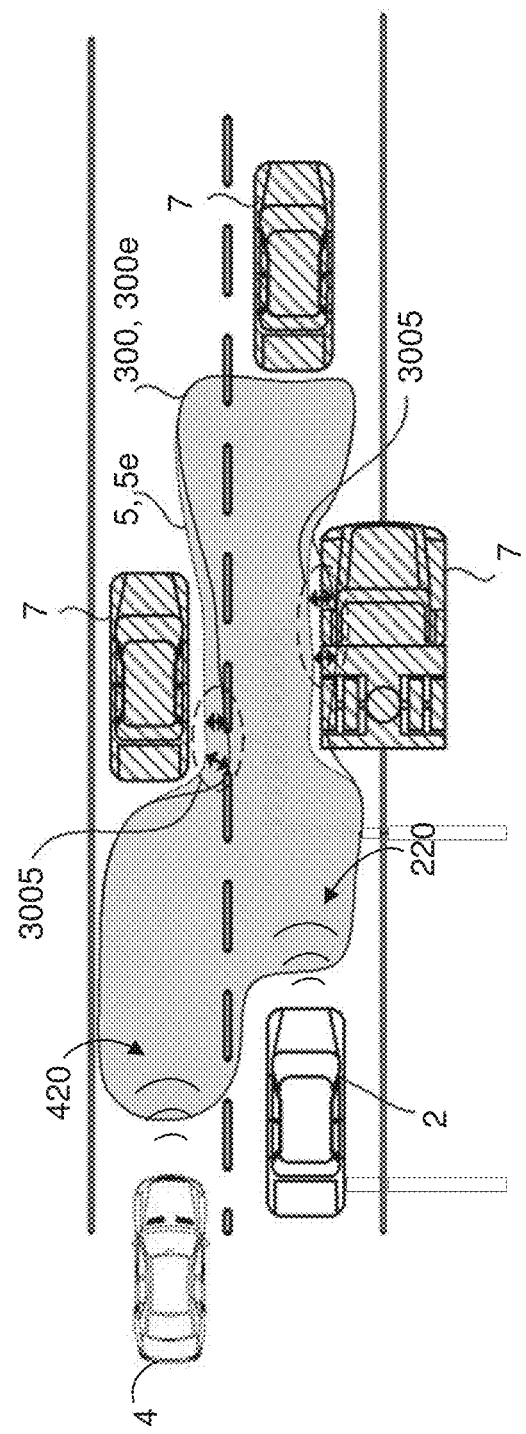
FIG. 3 illustrates a schematic view of an exemplifying third scenario involving an exemplifying assessment system according to embodiments of the disclosure.
Figure 4:
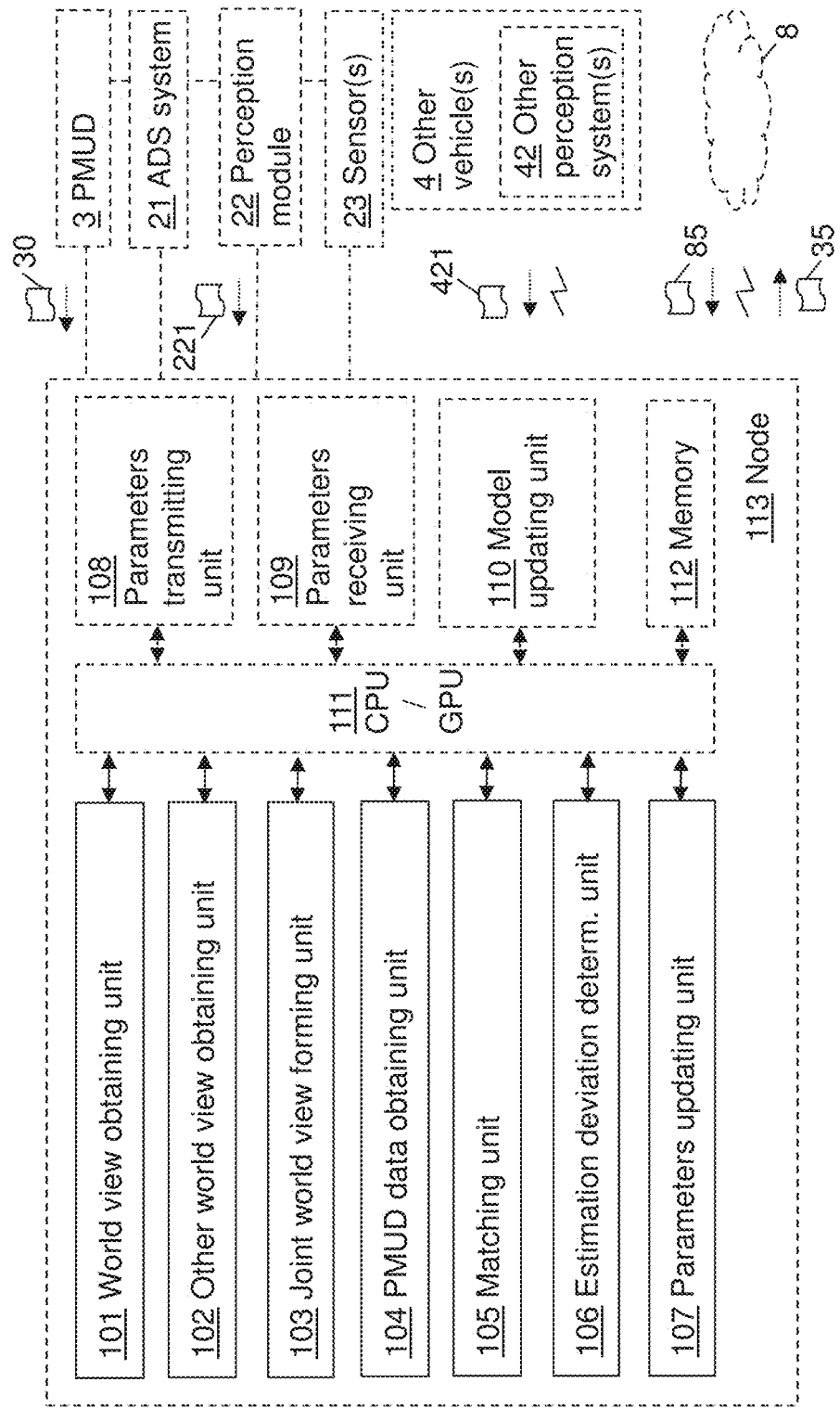
FIG. 4 is a schematic block diagram illustrating an exemplifying assessment system according to embodiments of the disclosure.

In the following, according to embodiments herein which relate to performance evaluation and updating of an ADS PMUD, there will be disclosed an approach enabling and/or supporting efficient development of ADS-related perception and/or perception features. Referring now to the figures, there is depicted in FIGS. 1-3 schematic views of respective exemplifying scenarios involving an exemplifying assessment system 1 according to embodiments of the disclosure, and in FIG. 4 depicted a schematic block diagram of an exemplifying assessment system 1 according to embodiments of the disclosure. The assessment system 1 is adapted for performance evaluation and updating of a perception module under development, PMUD 3, of an ego-vehicle 2 equipped with an ADS 21. The ego-vehicle 2—which may be referred to as host vehicle or merely vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle". Moreover, the ADS 21 on-board the ego-vehicle 2 may be represented by any arbitrary ADAS or AD system e.g. known in the art and/or yet to be developed. Moreover, the ego-vehicle 2 and/or ADS 21 comprises, is provided with and/or has onboard a perception module and/or system 22—herein referred to as an ego-vehicle perception module—adapted to estimate surroundings of the ego-vehicle 2, and subsequently adapted to estimate world views 220 of the surroundings e.g. with support from a—e.g. commonly known—digital map such as a high definition, HD, map, and/or an equivalent and/or successor thereof. The perception module 22 may refer to any commonly known system and/or functionality, e.g. comprised in one or more electronic control modules, ECUs, and/or nodes of the ego-vehicle 2 and/or the ADS 21, adapted and/or configured to interpret sensory information—relevant for driving of the ego-vehicle 2—to identify e.g. objects, obstacles, vehicle lanes, relevant signage, appropriate navigation paths etc. The perception module 22—which may be adapted to support e.g. sensor fusion, tracking, localization etc.—may thus be adapted to rely on sensory information. Such exemplifying sensory information may for instance be derived from one or more—e.g. commonly known—sensors 23 comprised in and/or provided onboard the ego-vehicle 2—herein referred to as one or more vehicle-mounted sensors—adapted to sense and/or perceive the ego-vehicle's 2 whereabouts and/or surroundings, for instance represented by one or a combination of one or more of surrounding detecting sensors, such as image capturing devices e.g. cameras, radar, lidar, ultrasonics etc., and/or a positioning system, odometer, inertial measurement units etc. In other word, a perception system 22 is in the present context thus to be understood as a system responsible for acquiring raw sensor data from on-board sensors 23, such as cameras, LIDARs and RADARs, ultrasonic sensors etc., and converting this raw data into scene understanding.

The additionally provided PMUD 3, on the other hand, may in a similar manner be represented by a perception module such as described above, with the difference that said PMUD 3 represents a Perception Module Under Development, PMUD, comprising one or more hardware and/or software perception features under development and/or to be tested in the ego-vehicle 2. Such perception features may refer to any feasible perception features, and for instance relate to and/or be represented by an object detection feature, an object classification feature, an object state estimation feature, a road reference estimation feature, a free-space estimation feature, a road friction estimation feature, an object trajectory estimation feature, a target/object tracking feature, an object trajectory estimation feature, a drivable-area estimation feature, an object property estimation feature, an ego-vehicle property estimation feature, an Operating Design Domain, ODD, parameter estimation feature, a road segment class estimation feature and/or an electronic horizon estimation feature. In other words, the PMUD 3 may in the present context be understood as software and/or hardware configured to generate a perception output based on input from one or more vehicle-mounted sensors 23, where the module 3 is under development and/or not yet in production e.g. not verified and/or validated. The phrase "assessment system" may refer to "perception development system", "perception features development system" and/or "computing system" and according to an example further to "in-vehicle assessment system", whereas "a method performed by an assessment system" may refer to "an at least partly computer-implemented method performed by an assessment system". Moreover, "for performance evaluation and updating of a PMUD" may refer to "for assessment of a PMUD", "for performance evaluation and parameter updating of a PMUD", "for automated development of a PMUD", "for supporting development of ADS-related perception and/or ADS-related perception features" and/or merely "for performance evaluation of a PMUD", whereas "PMUD" may refer to "perception-development module and/or system", "unreleased perception module", "new revision perception module" and/or "Perception Module Under Test, PMUT", and according to an example further to "PMUD comprising one or more hardware and/or software perception features under development and/or to be tested".

As illustrated in an exemplifying manner in exemplifying FIG. 4, the assessment system 1 is—e.g. by means of a world view obtaining unit 101—adapted and/or configured for obtaining world view data 221 from an ego-vehicle perception module 22 configured to generate the world view data 221 based on sensor data obtained from one or more vehicle-mounted sensors 23. Thereby, there is derived data 221 reflecting surroundings 220 as estimated and/or determined by the perception module 22 of the ego-vehicle 2 with support from one or more on-board sensor(s) 23. The world view data 221 may for instance comprise and/or be indicative of detected objects or objects' states and/or vehicle localization, and/or statistical and physical model predictions of future states, for instance derived continuously and/or intermittently. Moreover, the world view data 221 may be represented by at least a portion of sensor data obtained from the one or more vehicle-mounted sensors 23 of the ego-vehicle 2, and further—similar to the sensor data—be of any feasible format and/or size, for instance dictated by the circumstances at hand. The ego-vehicle perception module 22 may be represented by the perception module 22 discussed above adapted to estimate surroundings of the ego-vehicle 2, and similarly, the one or more vehicle-mounted sensors 23 represented by the above-discussed sensors 23 adapted to sense and/or perceive the ego-vehicle's 2 whereabouts and/or surroundings. The phrase "obtaining word view data" may refer to "retrieving, deriving and/or receiving world view data", whereas "world view data" may refer to "perception data" and/or merely "a world view". "Ego-vehicle perception module", on the other hand, may refer to "ego-vehicle perception system", whereas "ego-vehicle perception module configured to generate" may refer to "perception module of said ego-vehicle, said perception module being configured to generate". Moreover, "generate the world view based on sensor data obtained from one or more vehicle-mounted sensors" may refer to "generate the world view with input from and/or support from one or more vehicle-mounted sensors" and/or "generate the world view based on sensor data gathered and/or collected from one or more vehicle-mounted sensors". Furthermore, according to an example, the phrase "world view data" and/or "perception data" may throughout the disclosure refer to "surroundings assessment data", "spatial perception data", "processed sensory data", "temporal dependencies data" and/or "world view estimates", whereas "generate" in conjunction with world view data, other world view data and/or perception data throughout according to an example may refer to "estimate at least a portion of the surroundings", "interpret sensory information relevant for autonomous maneuvering" and/or "estimate vehicle surroundings and make model predictions of future states of the surroundings".

The assessment system 1 is further—e.g. by means of an other world view obtaining unit 102—adapted and/or configured for obtaining other world view data 421 generated by an other perception module 42 of at least a first other vehicle 4 in the surrounding environment of the ego-vehicle 2. Thereby, and as respectively illustrated in exemplifying FIGS. 1-3 where an other vehicle 4 in an exemplifying manner is positioned in a lane adjacent to an ego-vehicle lane, there is derived data 421 reflecting surroundings 420 as estimated and/or determined by a perception module 42 comprised in at least one other vehicle 4 positioned in vicinity of the ego-vehicle 2. Accordingly, in addition to obtaining data 221 relating to a world view 220 of the ego-vehicle 2, there is additionally obtained data relating to a world view 420 of at least a first other vehicle 4 near the ego-vehicle 2, which respective world views 220, 420—and subsequently respective world view data 221, 421—then may be assumed to at least partly overlap. The other world view data 421 may be obtained from the other vehicle(s) 4 in any feasible—e.g. known—manner, such as via vehicle to vehicle (V2V) communication. Furthermore, the at least first other vehicle 4 may be represented by any arbitrary number of vehicles in the ego-vehicle surroundings, for instance ranging from a single other vehicle 4 up to numerous other vehicles 4 such as up to three, ten or twenty vehicles. Said other vehicle(s) 4 may further be represented by any arbitrary feasible vehicle, for instance such a vehicle described above in conjunction with the ego-vehicle 2, further optionally be equipped with any feasible ADS—herein referred to as an other ADS 41—for instance such an ADS described above in conjunction with the ADS 21 of the ego-vehicle 2, and further optionally be provided with any feasible one or more sensors—herein referred to as other sensors 43—adapted to sense and/or perceive the at least first vehicle's 4 whereabouts and/or surroundings, for instance such sensors described above in conjunction with the one or more sensors 23 of the ego-vehicle 2. In a similar manner, the other vehicle perception module 42 may be represented by any feasible perception module adapted to estimate surroundings of the at least first vehicle 4, for instance such a perception system described above in conjunction with the ego-vehicle 2. The other world view data 421 of the at least first other vehicle 4 may—similarly to the ego-vehicle world view data 221—for instance comprise and/or be indicative of detected objects or objects' states and/or vehicle localization, and/or statistical and physical model predictions of future states, for instance derived continuously and/or intermittently. Moreover, the other world view data 421 may be represented by at least a portion of sensor data obtained from the optional other sensor(s) 43 of the at least first other vehicle 4, and further—similar to said sensor data—be of any feasible format and/or size, for instance dictated by the circumstances at hand. The phrase "obtaining other word view data" may refer to "retrieving, deriving and/or receiving other world view data", whereas "other world view data" may refer to "other perception data" and/or merely "an other world view". "Other perception module", on the other hand, may refer to "other perception system" and/or "other vehicle perception module", whereas "generated by an other perception module of at least a first other vehicle" may refer to "generated by an at least first other vehicle perception module", and according to an example further to "generated by an other perception module of at least a first other vehicle which other perception module is configured to generate the other world view data based on sensor data obtained, gathered and/or collected from—and/or with input from and/or support from—one or more other sensors on-board said at least first other vehicle". Moreover, "other" vehicle, world view, world view data, sensors, perception module and/or ADS may throughout refer to "external, complementary, contributory and/or secondary" vehicle, world view, world view data, sensors, perception module and/or ADS. Furthermore, "in the surrounding environment of said ego-vehicle" may refer to "within a predeterminable distance from said ego-vehicle, such as within fifty, one hundred or five hundred meters of said ego-vehicle, and/or within sensor range of said ego-vehicle".

Moreover, selection of which other vehicle(s) 4 to obtain said other world view data 421 from, may be determined in any feasible manner, such as selecting encountered other vehicle(s) 4 that are positioned in the ego-vehicle surroundings and supporting communicating with the ego-vehicle 2. Optionally, however, obtaining the other world view data 421 may comprise obtaining said other world view data 421 from one or more other vehicles 4 fulfilling vehicle adequacy criteria comprising conditions of under what circumstances an other vehicle 4 is deemed adequate to obtain other world view data 421 from. Thereby, other world view data 421 is obtained from vehicles 4 in the ego-vehicle surroundings meeting those conditions, whereby vehicles failing to do so may be discarded. Accordingly, in this case, one or more other vehicles 4 deemed relevant, feasible and/or of interest for providing its respective world view data 421—for instance as illustrated in an exemplifying manner in respective FIGS. 1-3 in that said other vehicle(s) 4 is positioned near and driving in a same direction as the ego-vehicle 2—may be filtered out, whereby a selective approach of obtaining other world view data 421 is supported. The vehicle adequacy criteria comprising conditions of under what circumstances an other vehicle 4 is deemed adequate to obtain other world view data 421 from, may be represented by any feasible criteria stipulating when an other vehicle 4 is considered relevant for provision of its world view data 421. According to an example, the vehicle adequacy criteria—which for instance may comprise one or more thresholds and/or threshold values—may relate to whether the other vehicle 4 is within communication range, field of view and/or sensor range of the ego-vehicle 2. Additionally or alternatively, the vehicle adequacy criteria may relate to distance, direction, field of view and/or pose etc. relative the ego-vehicle 2. Furthermore, additionally or alternatively, the vehicle adequacy criteria may relate to hardware and/or software characteristics and/or version of on-board perception module, ADS and/or sensors. The phrase "obtaining said other world view data from one or more other vehicles" may according to an example refer to "establishing communication with and obtaining said world view data from one or more other vehicles", whereas "fulfilling vehicle adequacy criteria" may refer to "fulfilling predeterminable vehicle adequacy criteria", "fulfilling vehicle selection criteria" and/or "meeting one or more vehicle adequacy thresholds". The phrase "vehicle adequacy criteria comprising conditions of under what circumstances an other vehicle is deemed adequate to obtain other world view data from", on the other hand, may refer to "vehicle adequacy criteria stipulating when an other vehicle is deemed adequate to obtain other world view data from", and according to an example further to "vehicle adequacy criteria comprising conditions of under what circumstances an other vehicle is deemed adequate to obtain other world view data from, said vehicle adequacy criteria relating to whether within communication range, field of view and/or sensor range of said ego-vehicle, relating to distance, direction, field of view and/or pose relative said ego-vehicle, and/or relating to hardware and/or software characteristics and/or version of onboard perception module, ADS and/or sensor(s)".

As illustrated in an exemplifying manner in exemplifying FIGS. 4, the assessment system 1 is further—e.g. by means of a joint world view forming unit 103—adapted and/or configured for forming a joint world view by matching the world view data 221 and the other world view data 421 in a common reference system. Thereby, world view data 221 not only from the ego-vehicle perception module 22 but also world view data 421 from the perception module 42 of at least one other vehicle 4 in vicinity of the ego-vehicle 2, may contribute to a combined world view, thus enabling for said combined world view to be enhanced. That is, there is accomplished a more reliable and/or more accurate world view—which may be referred to as a ground truth world view and/or baseline world view—in that contributions to said world view may be provided from more than a single perception module. In other word, by communicating with surrounding vehicles 4 that the ego-vehicle 2 encounters, collective data of the plurality of vehicles, 2, 4 can be used to create an enhanced version of the world view in the vicinity of the two vehicles 2, 4. The joint world view may for instance comprise information indicative of one or more scenes and/or scenarios in the surrounding environment of the ego-vehicle 2 and the other vehicle(s) 4, such as relating to positions of detected objects, object classes and/or types, positions of lane markers, extensions of lane markers, freespace detections, trajectories of detected objects, etc. The common reference system between the ego-vehicle 2 and the other vehicle(s) 4—which enables the obtained world view data 221 and the obtained other world view data 421 to be considered and/or assessed and formed into a joint world view—may be identified in any feasible manner, for instance with support from commonly detected objects. Further details relating to identifying a common reference system may be found in the European Patent Application No. EP20174909 by the same inventor(s) incorporated herein by reference, and will for the sake of brevity and conciseness not be further elaborated upon. The joint world view may cover at least a portion of the ego-vehicle perception module's 22 world view 220 and at least a portion of the other perception module's 42 world view 420, which portions at least partly overlap. Moreover, the joint world view may further be of any feasible dimensions and/or size. The phrase "forming a joint world view" may refer to "providing and/or generating a joint world view" and/or "forming a combined, collective and/or aggregated world view", and according to an example further to "forming an enhanced joint world view" and/or "forming a joint world view indicative of a scenario in ego-vehicle surroundings". Moreover, "by matching said world view data and said other world view data" may refer to "by combining, collecting and/or aggregating said world view data and said other world view data". The phrase "in a common reference system", on the other hand, may refer to "in a common reference frame", "in a same reference system" and/or "in a common reference system between said ego-vehicle and said at least first other vehicle", whereas "by matching said world view data and said other world view data in a common reference system" may refer to "by assessing said world view data and said other world view data in view of a common reference system".

The world view data 221 and the other world view data 421 may be matched in any feasible manner, with respective contribution to the joint world view being of any feasible respective extent. For instance, respective contribution of said world view data 221 and said other world view data 421 to the joint world view may according to one example be equally divided and according to another example respectively weighted in a predeterminable manner. Optionally, however, the world view data 221 and the other world view data 421 may comprise respective data adequacy attributes indicating respective adequacy of contributing to the joint world view. Forming a joint world view may then comprise forming said joint world view with extent of contribution from the world view data 221 and the other world view data 421 respectively being based on said respective data adequacy attributes. Thereby, data 221 from the ego-vehicle perception module 22 and data 421 from the other perception module(s) 42 may contribute to the joint world view to different extent and/or degree—for instance being discarded and/or suppressed—pertinent respective world view data's 221 and other world view data's 421 data adequacy attributes. Accordingly, in this case, data 221, 421 from one of the ego-vehicle perception module 22 and the other perception module 42 may be favoured over the other, thus enabling data 221, 421 deemed less adequate—for instance due to having a lower and/or relatively low confidence level—to be e.g. discarded and/or suppressed, subsequently to be prevented from contributing to—and/or contributing to lesser extent to—the joint world view data. The world view data's 221 data adequacy attributes indicating adequacy of said world view data 221 contributing to the joint world view, and correspondingly, the other world view data's 421 data adequacy attributes indicating said other world view data's 421 adequacy of contributing to the joint world view, may respectively be represented by any feasible attributes revealing suitability and/or validity of contribution to the joint world view. The data adequacy attributes may for instance relate to distance, direction, field of view and/or pose etc. of the other vehicle(s) 4 relative the ego-vehicle 2. Additionally or alternatively, the data adequacy attributes may relate to confidence and/or performance levels, such as estimated perception confidence level and/or sensor performance level, i.e. level of confidence of the world view data 221 and/or other world view data 421 and/or of level of sensor performance of the ego-vehicle 2 and/or other vehicle(s) 4, for instance as compared to one another. Furthermore, additionally or alternatively, the data adequacy attributes may relate to hardware and/or software characteristics and/or version of on-board perception module, ADS and/or sensors of respective ego-vehicle 2 and other vehicle(s) 4. Accordingly, the construction of the joint world view can be seen as fusing the world view data 221 with the other world view data 421, where the joint world view can be constructed for instance as a weighted average of the two sets of world view data 221, 421, in which the weights for instance can be a function of the confidence levels of the world view data 221, 421. The confidence levels do not necessarily need to be a single number for each of the world view data 221, 421; rather, the confidence level may vary in different regions of the world view data 221, 421 as a function of selected variables, such as distance from the vehicle 2, 4 and/or field of view. Furthermore, the weights may be seen as degree of adequacy of each of the world view data 221, 421, whereupon the two sets of world view data 221, 421 may be combined in a weighted manner to construct the joint world view. According to an example, extent of contribution to the joint world view from the world view data 221 and/or other world view data 421, respectively, may for instance be dictated by predeterminable data adequacy criteria, such as per perception parameter. For instance, the world view data 221 may be down-weighted, suppressed and/or discarded from joint world view contribution should said world view data 221 not fulfil—and/or the other world view data 421 may be down-weighted, suppressed and/or discarded from joint world view contribution should said other world view data 421 not fulfil—such data adequacy criteria. The adequacy criteria may comprise conditions and/or limits of under what circumstances and/or to what level world view data 221 and/or other world view data 421 is deemed adequate to contribute to the joint world view. According to an example, the data adequacy criteria—which for instance may comprise one or more thresholds and/or threshold values—may stipulate conditions relating to distance, direction, field of view and/or pose etc. relative the ego-vehicle 2. Additionally or alternatively, the data adequacy criteria may stipulate conditions relating to confidence and/or performance levels, such as estimated perception confidence level and/or sensor performance level. Furthermore, additionally or alternatively, the data adequacy criteria may stipulate conditions relating to hardware and/or software characteristics and/or version of on-board perception module, ADS and/or sensors. The phrase "data adequacy attributes" may refer to "data selection attributes" and/or "data adequacy properties", whereas "indicating respective adequacy of contributing to said joint world view" may refer to "comprising one or more contribution relevance indicators". According to an example, the phrase "respective data adequacy attributes indicating respective adequacy of contributing to said joint world view" may comprise "respective data adequacy attributes indicating respective adequacy of contributing to said joint world view, said respective data adequacy attributes relating to distance, direction, field of view and/or pose of the other vehicle(s) relative said ego-vehicle, relating to perception confidence level and/or sensor performance level, and/or relating to hardware and/or software characteristics and/or version of on-board perception module, ADS and/or sensor(s)". Furthermore, "forming said joint world view with extent of contribution" may refer to "forming said joint world view with degree and/or amount of contribution" and/or "forming said joint world view with extent of input". According to an example, the phrase "forming said joint world view with extent of contribution from said world view data and said other world view data being based on said respective data adequacy attributes" may refer to "forming said joint world view with extent of contribution from said world view data and said other world view data being based on said respective data adequacy attributes, by down-weighting, suppressing and/or discarding world view data and/or other world view data not fulfilling predeterminable data adequacy criteria".

As illustrated in an exemplifying manner in exemplifying FIGS. 1-3, the assessment system 1 is further—e.g. by means of a PMUD data obtaining unit 104—adapted and/or configured for obtaining perception data 30 from the PMUD 3, which PMUD 3 is configured to generate the perception data 30 based on a perception model and sensor data obtained from one or more vehicle-mounted sensors 23, wherein the perception data 30 is indicative of a perceptive parameter 300 of the surrounding environment of the ego-vehicle 2. Thereby, there is retrieved data 30 reflecting surroundings as estimated and/or determined by the PMUD 3 as derived from its perception model with support from one or more on-board sensor(s) 23. The perception model may in the present context be understood as a software algorithm configured to receive input in the form of sensor data—raw or having some level of preprocessing—and to therefore generate an output 30 comprising a representation of at least a portion of the surrounding environment of the ego-vehicle 2. The perception model may for instance be in the form of a neural network, and the model parameters accordingly be in the form of network weights. A number of perception models may exist, used independently for different tasks such as lane segmentation, traffic sign identification, free-space estimation, etc. The perceptive parameter 300 of which the perception data 30 is indicative, may be represented by any feasible parameter detectable. According to an example, the PMUD 3 may for instance comprise a lane tracing and/or lane tracking algorithm and/or a road geometry estimation algorithm, whereupon the output 30 from the PMUD 3 then for instance may comprise and/or be indicative of a perceptive parameter 300 represented by a road reference feature estimation, such as a representation of the road or lane geometry in the surrounding environment of the ego-vehicle 2. Additionally or alternatively, the perception data 30 may for instance comprise a set of bounding boxes indicating one or more perceptive parameters 300 represented by a position and classification of a set of external objects—such as one or more vehicles—in the surrounding environment of the ego-vehicle 2. Optionally, said perceptive parameter 300 may comprise at least one of an object detection estimation; an object classification estimation; an object state estimation; a road reference estimation; a free-space estimation; an object trajectory estimation; a drivable-area estimation; an object property estimation, e.g. object size, 3D bounding box, color, vehicle model, license plate etc.; an ego vehicle property estimation; an ODD parameter estimation, e.g. weather, light conditions etc.; a road segment class estimation, e.g. road works; and an electronic horizon estimation, e.g. what objects can be expected ahead not yet detected. Moreover, the input to the PMUD 3 could be any combination of existing production sensors, their raw output, the raw detections or any more or less processed state in the chain. It could also be any combination of newly mounted sensors and their output, i.e. sensor output that is not used to generate the ego-vehicle perception module world view data 221, for instance if one would want to test and evaluate e.g. an object detection algorithm that is based on a different type of input data from a new type of sensor. Thus, the one or more vehicle-mounted sensors 23 used for generating the PMUD perception data 30 may be represented by the previously discussed sensors 23 adapted to sense and/or perceive the ego-vehicle's 2 whereabouts and/or surroundings, and further, none, at least one or all of said sensors 23 may equate to the sensor(s) 23 used for generating the ego-vehicle perception module world view data 221 previously discussed. The phrase "obtaining perception data" may refer to "retrieving, deriving and/or receiving perception data", whereas "perception data" may refer to "development perception data", "world view data" and/or merely "a development world view". Moreover, "generate the perception data based on a perception model and sensor data obtained from one or more vehicle-mounted sensors" may refer to "generate the perception data based on a perception model and sensor data gathered and/or collected from—and/or with input from and/or support from—one or more vehicle-mounted sensors". Furthermore, "indicative of a perceptive parameter" may refer to "indicative of one or more perceptive parameters and/or at least a first perceptive parameter".

As illustrated in an exemplifying manner in exemplifying FIGS. 1-3, the assessment system 1 is further—e.g. by means of a matching unit 105—adapted and/or configured for matching the perception data 30 to the formed joint world view. Thereby, the perception data 30 as provided by the PMUD 3 is compared to and/or overlaid the joint world view as provided by the ego-vehicle perception module 22 and other vehicle perception module(s) 42. In other words, the matching may be construed as a comparison step between the perception data 30 and the formed joint world view so to identify a level of matching between one or more perceptive parameters 300—e.g. object positions—in the perception data 30 and a corresponding perceptive parameters 5 in the joint world view. For example, the matching may include comparing the position of an identified object e.g. vehicle in the perception data 30 with the position of that vehicle in the joint worldview. A purpose of the matching is to match an object from the perception data 30 with one object from the joint world view, both corresponding to one unique object in the real world. The matching of the perception data 30 to the joint world view may be represented by matching at least a portion and/or region of said perception data 30 to at least a portion and/or region of the joint world view. For instance, one may limit an area within which the matching process is performed, such that one only compares the perception data 30 and joint world view representing an area within a specific viewing frustum or within a certain distance from the ego-vehicle 2. Thereby, objects that are further away from the ego-vehicle 2 may be ignored as they are more likely to be associated with higher uncertainties and therefore more difficult to match. Furthermore, this may result in reduced processing power requirements. The phrase "matching the perception data" may refer to "comparing the perception data", whereas "matching the perception data to the formed joint world view" according to an example may refer to "overlaying the formed joint world view with the perception data". Moreover, according to an example, the phrase "matching said perception data to the formed joint world view" may refer to "matching said perception data to the formed joint world view in order to identify a match between said perceptive parameter of the perception data and a corresponding perceptive parameter in said joint world view".

As illustrated in an exemplifying manner in exemplifying FIGS. 1-3, the assessment system 1 is further—e.g. by means of a estimation deviation determining unit 106—adapted and/or configured for evaluating the obtained perception data 30 in reference to the joint world view in order to determine an estimation deviation 3005 in an identified match between the perceptive parameter 300 of the perception data 30 and a corresponding perceptive parameter 5 in the joint world view. Thereby, in that the perception data 30 is analyzed in view of the joint world view and subsequently that there is established a potential estimation difference 3005 between the PMUD perceptive parameter 300 as compared to a found corresponding perceptive parameter 5 in the joint world view, a performance of the PMUD 3 may be assessed. That is, after corresponding objects from the joint world view and the perception data 30 are matched together, their associated perceptive parameter(s) 5, 300—e.g. positions, speed, heading, etc.—are compared, their difference indicated by said estimation deviation 3005. Stated differently, once a match between the perceptive parameter 300 and the corresponding perceptive parameter 5 in the joint world view has been identified and/or established, one can determine and/or calculate an estimation deviation 3005 that indicates how well the PMUD 3 performed. The estimation deviation 3005 may for instance be determined based on the type of perceptive parameter 300, and accordingly, one estimation deviation 3005 may be formed and/or defined if the perception model of the PMUD 3 is e.g. an object detection algorithm, while another estimation deviation 3005 may be formed and/or defined if it is e.g. a lane-tracing algorithm. For instance, if the perception model of the PMUD 3 is an object detection algorithm configured to generate bounding boxes, then a difference between the location and dimensions of these bounding boxes in the perception data 30 and the location and dimensions of the matched bounding boxes in the joint world view may be used to derive an estimation error. That is, if the perceptive parameter 300 is an object position estimation or an object occupancy estimation, then the estimation error may be in the form of a lateral and longitudinal offset of closest point—of the detected object to the ego-vehicle 2—between the bounding box representation of an object in the perception data 30 and the bounding box representation of the corresponding object in the joint world view. Accordingly, the step of evaluating the obtained perception data 30 may comprise determining and/or forming an estimation deviation based on the determined estimation error. According to an example, the evaluation may potentially be performed in the image plane on a pixel level, whereby one can evaluate and train camera software directly on the pixel level. The phrase "evaluating the obtained perception data" may refer to "assessing, analyzing and/or comparing the obtained perception data", whereas "in reference to said joint world view" may refer to "in view of said joint world view" and according to an example further to "in reference to said joint world view, which joint world view constitutes a ground truth". Moreover, according to an example "evaluating the obtained perception data in reference to said joint world view in order to determine an estimation deviation" may refer to "determining an estimation deviation", whereas "estimation deviation" may refer to "estimation error". Furthermore, "an estimation deviation" may refer to "at least a first estimation deviation", "an estimation difference" and/or merely "deviation", whereas "estimation deviation in an identified match between" may refer to "estimation deviation for an identified match between" and/or "estimation deviation in a match identified between". According to an example, "estimation deviation" may refer to "cost function and/or loss function" and the phrase "in order to determine an estimation deviation in an identified match" may refer to "in order to determine a cost function and/or loss function indicative of a performance of the PMUD based on an identified match".

As illustrated in an exemplifying manner in exemplifying FIGS. 1-3, the assessment system 1 is further—e.g. by means of a parameters updating unit 107—adapted and/or configured for updating one or more parameters of the perception model based on the determined estimation deviation 3005. Thereby, an update of perception model software parameters may be locally conducted taking into consideration said estimation deviation 3005, and accordingly there is provided a learning process for various perception features in autonomous driving applications. That is, the herein proposed learning regime relies on a joint world view which provides a baseline and/or ground truth towards which the output of the software/hardware under development is compared, thus providing advantages in terms of cost effective and/or time efficient development of perception features for autonomous driving applications, cost effective updates of the hardware platform of the sensor hardware as well as the computational hardware of the ADS 21, and/or efficient utilization of available resources in vehicles 2, 4 to facilitate the development of perception features. In other words, the present invention provides a time efficient and/or cost effective solution for developing consecutive releases of perception features for autonomous vehicles. Thus, there is supported cost effective development of next generation sensor platform(s)—hardware and/or software—to reduce system cost for future products and/or systems. Further, one may similarly utilize the teachings herein to improve the efficiency of e.g. vision and fusion algorithms to allow for execution on leaner computational hardware and thereby provide additional cost reductions of the hardware platform. The phrase "updating one or more parameters of said perception model" may refer to "updating one or more parameters of said perception model of the PMUD". Moreover, according to an example, the phrase "updating one or more parameters of said perception model based on said estimation deviation" may refer to "updating one or more parameters of said perception model by means of an algorithm, such as an optimization algorithm, configured to affect, such as to minimize or essentially minimize, the estimation deviation, for instance cost function, in a predeterminable manner, such as minimizing or essentially minimizing said estimation deviation". The one or more parameters of the perception model may be updated in any feasible manner taking into consideration the estimated deviation 3005. For instance, the one or more parameters may be updated by means of an algorithm—such as an optimization algorithm—configured to affect—such as to minimize or essentially minimize—the estimation deviation 3005 in a predeterminable manner, such as minimizing or essentially minimizing said estimation deviation 3005. According to an example, such an algorithm may refer to and/or comprise back propagation for neural networks. Further details relating to updating one or more parameters of a perception model as described above and/or details relating to the briefly mentioned optional cost function may be found in the European Patent Application No. EP21158017 by the same applicant incorporated herein by reference, and will for the sake of brevity and conciseness not be further elaborated upon.

The evaluation process may involve comparison of any arbitrary feasible perception-related parameter(s), such as comparing detected objects, their states, free-space, lanes, road position, drivable area, etc., and/or a combination thereof. In exemplifying FIG. 1, the perceptive parameter 300 and corresponding perceptive parameter 5 are respectively represented by an object detection estimation, and the estimation deviation 3005 indicated by the double-headed arrows represented by a difference in the location between detected object 300a, 300b, 300c—or a bounding box around detected object 300a, 300b, 300c—and detected corresponding objects 5a, 5b, 5c—or a bounding box around the detected corresponding objects 5a, 5b, 5c—in the joint world view. Here, a match between the perceptive parameter(s) 300 and the corresponding perceptive parameter(s) 5 was identified for two of the detected objects 300a, 300b—exemplified by vehicles—detected by the PMUD 3, while no match could be identified for a third detected object 300c. In the evaluation process, only the matched data—i.e. the identified matches—are used for determining the estimation deviation 3005, to ensure that a relevant comparison is being made between the perception data 30 and the joint world view data.

In exemplifying FIG. 2, the perceptive parameter 300 and corresponding perceptive parameter 5 are respectively represented by lane geometry estimations. That is, in FIG. 2, there is illustrated a road portion having two lanes turning to the left in front of the ego-vehicle 2. The true lane markings are indicated by reference numeral 6, the joint world view's lane geometry estimation indicated by reference numeral 5d, while the PMUD's 3 lane geometry estimation is indicated by reference numeral 300d. Analogously as discusses in conjunction with FIG. 1, a match between the lane traces of the PMUD's 3 output 30 and the joint world view is identified, and an estimation deviation 3005 is derived. Here the estimation deviation 3005 is indicated as a difference between the locations and/or geometries of the lane geometry estimations 5d, 300d. In exemplifying FIG. 3, on the other hand, the perceptive parameter 300 and corresponding perceptive parameter 5 are respectively represented by free-space estimations. That is, in FIG. 3, there is illustrated a road portion having two lanes and three exemplifying external objects 7 in the form of two passenger vehicles and a tractor located in front of the ego-vehicle 2. The free-space estimation of the joint world view is indicated by reference numeral 5e, while the free-space estimation of the PMUD 3 is indicated by reference numeral 300e. The estimation deviation 3005 is, in the illustrated example, simply derived by a measurement or metric indicative of the non-overlapping parts of the two free-space estimations 5e, 300e. In terms of set theory this may be understood as the symmetric difference 3005 between the free-space set defined by the free-space estimation 300e of the PMUD 3 and the free-space set 5e defined by the joint world view. The estimation deviation 3005 is then used to update one or more parameters of the perception model of the PMUD 3. Free-space areas may in the present context be understood as areas in the surrounding environment absent of objects, e.g. other vehicles, pedestrians, barriers, animals, bicycles, static objects, etc. Thus, the location of free-space areas may be understood as estimates of areas absent of external static and/or dynamic objects. One can consider an estimation of "drivable area" in an analogous fashion, where in addition to the estimation of areas absent of objects—as in the case of free space—the estimation also includes the presence of a road surface.

Optionally, as illustrated in an exemplifying manner in exemplifying FIG. 4, the assessment system 1 may further—e.g. by means of an optional parameters transmitting unit 108—be adapted and/or configured for transmitting the one or more updated parameters 35 of the perception model of the PMUD 3 to a remote entity 8. Thereby, the learnt parameters and/or weights 35 may be provided to a back-office 8 for further handling. Moreover, optionally, and as illustrated in an exemplifying manner in exemplifying FIG. 4, the assessment system 1 may further—e.g. by means of an optional parameters receiving unit 109—be adapted and/or configured for receiving a set of globally updated parameters 85 of the perception model of the PMUD 3 from the remote entity 8, wherein the set of globally updated parameters 85 are based on information obtained from a plurality of vehicles comprising the PMUD 3. The assessment system 1 may then further—e.g. by means of an optional model updating unit 109—be adapted and/or configured for updating the perception model of the PMUD 3 based on the received set of globally updated parameters 85. Thereby, locally updated perception model software across a fleet of production vehicles may subsequently be consolidated in a central system 8 in order to push—at least to the ego-vehicle 2—a "globally" updated version of the software. That is, learnt parameters and/or weights 35 may be consolidated in the back-office 8, which enables perception features related to e.g. new sensor hardware and/or e.g. new algorithms for existing sensors to be developed using federated learning. The remote entity 8—which may be referred to as the back-office—may for instance be represented by and/or comprise a central system or a cloud system capable of receiving and transmitting data to a fleet of ADS-equipped vehicles and/or being responsible for the management and maintenance of ADSs deployed in a vehicle fleet. The set of globally updated parameters 85 may be based on information obtained from a plurality of vehicles comprising the PMUD 3. The transmitting of the one or more updated model parameters 35 from the ego-vehicle 2 to the remote entity 8, on the other hand, may be associated with a predeterminable trigger or criteria, where the updated model parameters 35 are stored locally in the ego-vehicle 2 until that trigger is detected or criteria is fulfilled. Once the trigger is detected or once the criteria is fulfilled, the updated model parameters 35 are transmitted to the remote entity 8. Naturally, the time of transmission may further depend on external factors such as network availability and network quality. One example of a trigger and/or criteria may be driving a predeterminable distance and/or for a predeterminable amount of time, in which case model parameters may be transmitted even if no update has been made to the model parameters, which in turn may signal that the perceptive model is performing well. A further example of a trigger and/or criteria may be exceeding a number of updates, i.e. the updated model parameters of the perception model are transmitted to the remote entity 8 once the perception model has been exposed to N number of updates, where N for example may be any positive integer ≥2. Another example of a trigger and/or criteria may be exceeding a threshold of change from a base perception model e.g. base-algorithm weights, i.e. the updated model parameters of the perception model are transmitted to the remote entity 8 once a model parameter of the perception model have been updated such that the updated value result in a change ≥K % from the base value, where K may for example be any positive real value. The base perception model need not be the first perception model launched in the vehicles, but may for example be defined as the perception model obtained after the perception model has been updated with the globally updated parameters 85. Thus, with every global update, a new base perception model is defined, which in turn dictates the triggers/thresholds described above. In other words, the remote entity 8 may consolidate the learned parameters of vehicles—e.g. of each vehicle—in a fleet of vehicles, and push an update of the PMUD 3 to vehicles—e.g. each vehicle—in the fleet. Thereby, one may utilize an entire fleet of production vehicles—instead of a few specialized test-vehicles—to develop and verify various perception features associated with an ADS 21. Moreover, since the data that is being transmitted between the vehicles and the remote entity 8 is in the form of model parameters—e.g. network weights—instead of e.g. raw or processed sensor data, advantages in terms of bandwidth requirements, data storage, data security, data privacy, and compliance with data regulations are readily achievable.

As further shown in FIG. 4, the assessment system 1 comprises a world view obtaining unit 101, an other world view obtaining unit 102, a joint world view forming unit 103, a PMUD data obtaining unit 104, a matching unit 105, an estimation deviation determining unit 106, a parameters updating unit 107, an optional parameters transmitting unit 108, an optional parameters receiving unit 109 and an optional model updating unit 110, all of which already have been described in greater detail above. Furthermore, the embodiments herein for performance evaluation and updating of a PMUD 3 of an ego-vehicle 2 equipped with an ADS 21, may be implemented through one or more processors, such as a processor 111, for instance represented by at least a first Central Processing Unit, CPU, and/or at least a first Graphics Processing Unit, GPU, together with computer program code for performing the functions and actions of the embodiments herein. Said program code may also be provided as a computer program product, for instance in the form of a data carrier carrying computer program code for performing the embodiments herein when being loaded into the assessment system 1. One such carrier may be in the form of a CD/DVD ROM disc and/or a hard drive, it is however feasible with other data carriers. The computer program code may furthermore be provided as pure program code on a server and downloaded to the assessment system 1. The assessment system 1 may further comprise a memory 112 comprising one or more memory units. The memory 112 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 112 may be arranged to be used to store e.g. information, and further to store data, configurations, scheduling, and applications, to perform the methods herein when being executed in the assessment system 1. For instance, the computer program code may be implemented in the firmware, stored in FLASH memory 112, of an embedded processor 111, and/or downloaded wirelessly e.g. from an off-board server. Furthermore, units 101-110, the optional processor 111 and/or the optional memory 112, may at least partly be comprised in one or more nodes 113 e.g. ECUs of the ego-vehicle 2, e.g. in and/or in association with the ADS 21. Those skilled in the art will also appreciate that said units 101-110 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 112, that when executed by the one or more processors such as the processor 111 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 5:
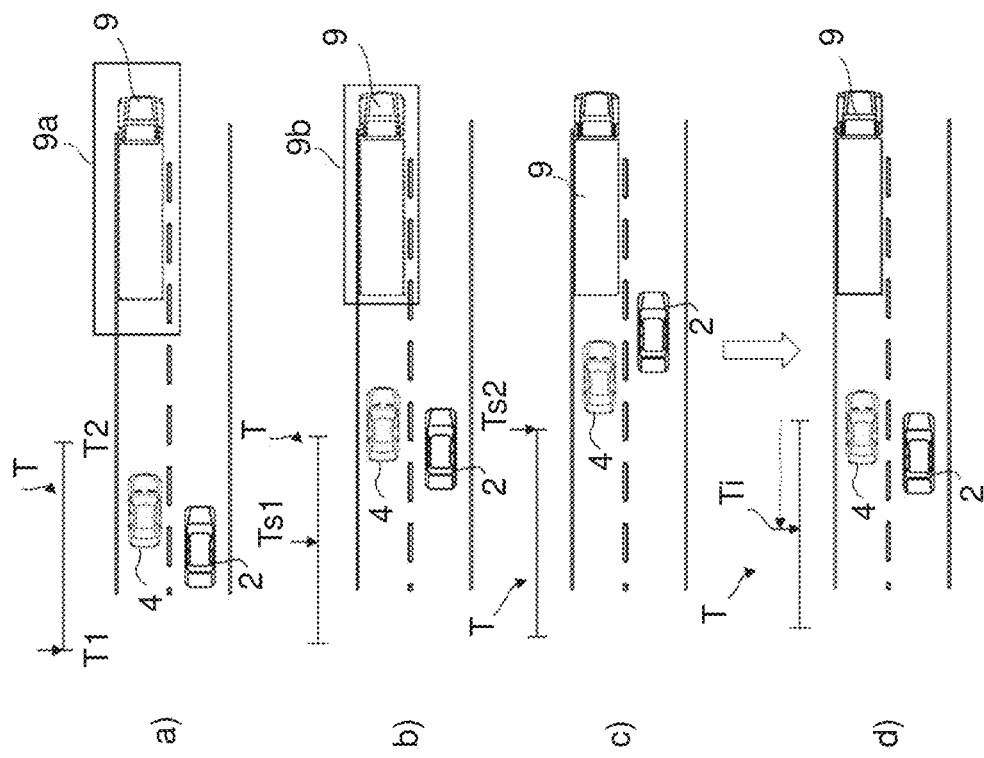
FIG. 5 illustrates a schematic view of an exemplifying fourth scenario involving an exemplifying assessment system according to embodiments of the disclosure.

Potentially, and as illustrated in an exemplifying manner in exemplifying FIG. 5 in which a temporal aspect is taken into consideration, obtaining the world view data 221 may comprise storing, during a time period T, a set of world view data 221 obtained from the perception module 22, generated during the time period T. Obtaining other world view data 421 may then comprise storing, during essentially said time period T, an other set of world view data 421 obtained from the other perception module 42, generated during—or essentially during—said time period T. Furthermore, forming a joint world view may then comprise forming the joint world view by post-processing respectively or jointly the set of world view data 221 and the other set of world view data 421, the formed joint world view being indicative of the surrounding environment of the ego-vehicle 2 during the time period T. Moreover, obtaining the perception data 30 may then comprise obtaining a set of perception data 30 from the PMUD 3, generated based on the perception model and sensor data obtained from the one or more vehicle-mounted sensors 23 during—or essentially during—the time period T. Further potentially, and as illustrated in an exemplifying manner in exemplifying FIG. 5, said time period T may range from a first time point T1 to a second time point T2. Forming the joint world view may then comprise forming the joint world view based on post-processing a portion of the set of world view data 221 and the other world view data 421, which portion ranges back from the second time point T2 to an intermediate time point Ti between the first and second time points T1, T2, the formed joint world view being indicative of the surrounding environment of the ego-vehicle 2 conditional on said portion. Moreover, the post-processing of said portion may potentially further comprise running said portion through at least a first backwards filter configured to align a set of perceptive parameters 5 in the set of world view data 221 and/or the other set of world view data 421 at the intermediate time point Ti, based on a development of the state(s) of the set of perceptive parameters 5 from the intermediate time point Ti to the second time point T2. Thereby, with the increased knowledge of the ego-vehicle surroundings as time passes from an intermediate time point Ti to the second time point T2 and by analyzing data in reverse temporal direction, one may be able to determine, with a higher level of accuracy, the state—i.e. classes, positions, trajectories, etc.—of the objects in the ego-vehicle's 2 surroundings at the intermediate time point Ti, than was possible to do at run-time.

The foregoing is illustrated in an exemplifying manner in FIG. 5, where there is depicted a series of scenes depicting a temporal development of the ego-vehicle 2 and the other vehicle(s) 4 approaching an external object 9. Each illustration is associated with a point in time within a time period T ranging from a first moment in time T1 to a second moment in time T2. In the first illustration (a), the ego-vehicle 2 and the other vehicle(s) 4 are moving towards an external object 9, here in the form of an exemplifying truck, that is traveling in the same direction in an adjacent lane on the road portion. However, due to the distance to the external object 9, the vehicles' 2, 4 perception modules 22, 42 may not be able to determine, with a sufficiently high level of accuracy, the position of the external object 9, and to classify it as a truck. This is indicated by the box 9*a* enclosing the truck, which serves to schematically indicate the uncertainties of the detection and classification. At a subsequent moment in time Ts1, i.e. illustration (b) of FIG. 5, the vehicles 2, 4 are closer to the external object 9, and the uncertainties regarding the external object's 9 position and class/type are reduced, as indicated by the reduced size box 9*b* as compared to box 9*a*. At yet another subsequent moment in time Ts2, i.e. illustration (c) of FIG. 5, the vehicles 2, 4 perception modules 22, 42 are able to accurately determine the external object's 9 position and classify it as a truck. More specifically, the ego-vehicle 2 and the other vehicle(s) 4 are now sufficiently close to the truck 9 to be able to classify it and estimate the truck's position on the road with a higher level of accuracy as compared to when the vehicles 2, 4 were located further away from the truck. Then, by means of a suitable filtering technique and based on the temporal development of the scenario, one is able to establish a joint worldview at an intermediate point Ti in time between T1 and T2, as indicated in the bottom illustration (d) in FIG. 5. It may be noted that the post-processing may include further processing steps than running it through a backwards filter, and for instance include fusion of data from various sensors, as well as applying backward and forward filtering on the fused information such as by utilizing Particle filters or different types of Kalman filters, e.g. extended Kalman filters. Further details relating to post-processing as described above may be found in the European Patent Application No. EP21158017 by the same applicant incorporated herein by reference, and will for the sake of brevity and conciseness not be further elaborated upon. The term "storing" data 221, 421 may in this context refer to "storing in one or more memories", "storing in vehicle", "storing in one or more memories", and/or "storing digitally and/or electronically", whereas the term "set" of data 221, 421, on the other hand, may refer to "range", "amount", "series", "continuous and/or intermittent flow" and/or "collection" of data 221, 421. The time period T—and correspondingly the length of an optional data buffer—may be of any arbitrary size deemed feasible, e.g. in consideration of data capacity restraints, and may for instance range from under a second up to several minutes, or more preferred, from a few seconds up to less than a minute. Moreover, the phrase "forming, by post-processing" does not necessarily mean that all of the stored data is post-processed, but should be construed as that at least a portion or at least a range of the stored data is post-processed.

Figure 6:
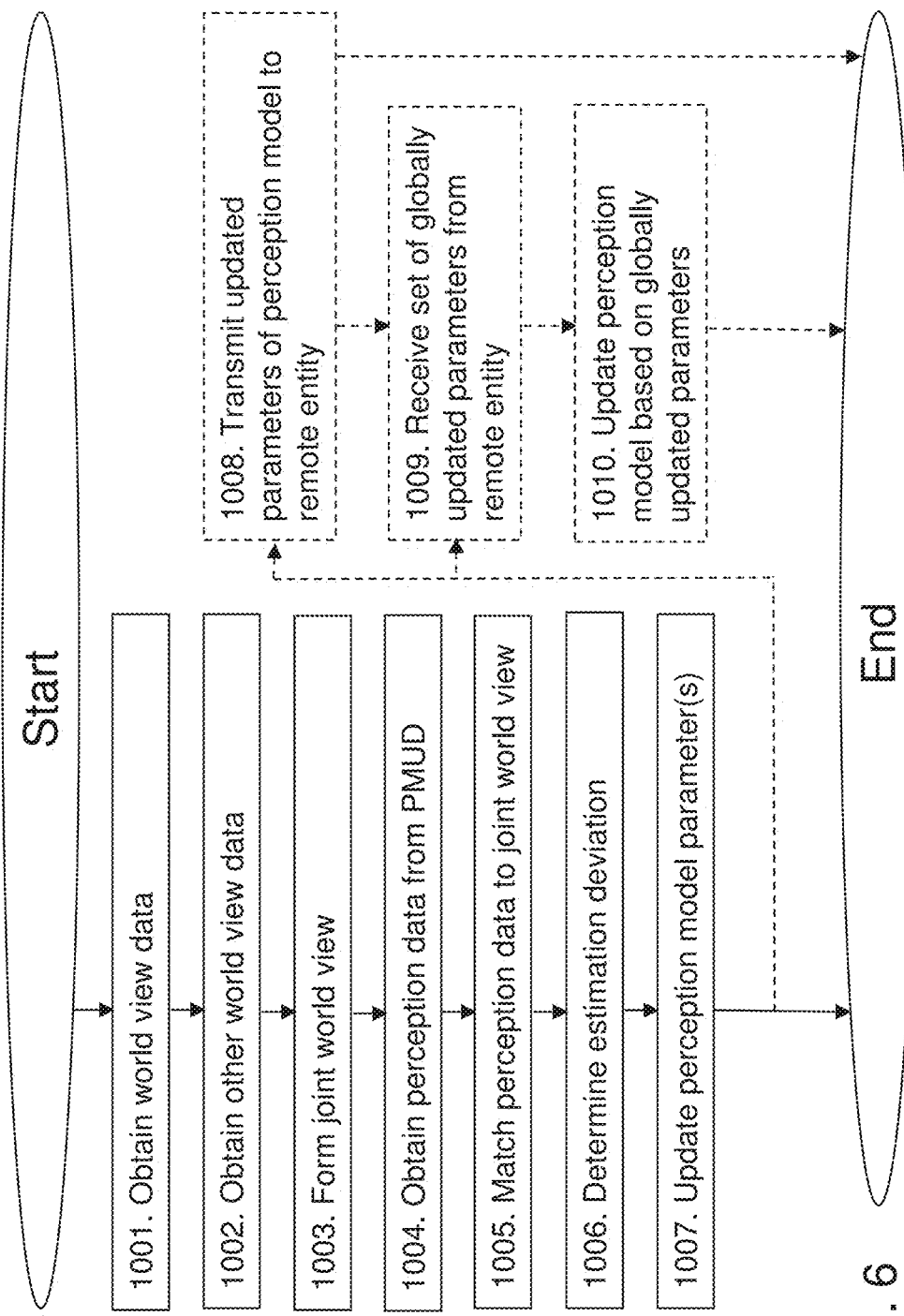
FIG. 6 is a flowchart depicting an exemplifying method performed by an assessment system according to embodiments of the disclosure.

FIG. 6 is a flowchart depicting an exemplifying method performed by an assessment system 1 according to embodiments of the disclosure. Said method is for performance evaluation and updating of a PMUD 3 of an ego-vehicle 2 equipped with an ADS 21. The exemplifying method, which may be continuously repeated, comprises one or more of the following actions discussed with support from FIGS. 1-5. Moreover, the actions may be taken in any suitable order and/or one or more actions may be performed simultaneously and/or in alternate order where applicable. For instance, Actions 1001, 1002 and Action 1004 may be performed in alternate order and/or simultaneously.

Action 1001

In Action 1001, the assessment system 1 obtains—e.g. with support from the world view obtaining unit 101—world view data 221 from an ego-vehicle perception module 22 configured to generate the world view data 221 based on sensor data obtained from one or more vehicle-mounted sensors 23.

Action 1002

In Action 1002, the assessment system 1 obtains—e.g. with support from the other world view obtaining unit 102—other world view data 421 generated by an other perception module 42 of at least a first other vehicle 4 in the surrounding environment of the ego-vehicle 4. Optionally, Action 1002 of obtaining other world view data 421 may comprise obtaining said other world view data 421 from one or more other vehicles 4 fulfilling vehicle adequacy criteria comprising conditions of under what circumstances an other vehicle 4 is deemed adequate to obtain other world view data 421 from.

Action 1003

In Action 1003, the assessment system 1 forms—e.g. with support from the joint world view forming unit 103—a joint world view by matching the world view data 221 and the other world view data 421 in a common reference system. Optionally, the world view data 221 and the other world view data 421 may comprise respective data adequacy attributes indicating respective adequacy of contributing to the joint world view. Action 1003 of forming a joint world view may then comprise—and/or the joint world view forming unit 103 may be adapted and/or configures for—forming said joint world view with extent of contribution from the world view data 221 and the other world view data 421 respectively being based on the respective data adequacy attributes.

Action 1004

In Action 1004, the assessment system 1 obtains—e.g. with support from the PMUD data obtaining unit 104—perception data 30 from the PMUD 3, said PMUD 3 being configured to generate the perception data 30 based on a perception model and sensor data obtained from one or more vehicle-mounted sensors 23, wherein the perception data 30 is indicative of a perceptive parameter 300 of the surrounding environment of the ego-vehicle 2. Optionally, the perceptive parameter may comprise at least one of an object detection estimation; an object classification estimation; an object state estimation; a road reference estimation; a free-space estimation; an object trajectory estimation; a drivable-area estimation; an object property estimation; an ego vehicle property estimation; an ODD parameter estimation; a road segment class estimation; and an electronic horizon estimation.

Action 1005

In Action 1005, the assessment system 1 matches—e.g. with support from the matching unit 105—the perception data 30 to the formed joint world view.

Action 1006

In Action 1006, the assessment system 1 evaluates—e.g. with support from the estimation deviation determining unit 106—the obtained perception data 30 in reference to the joint world view in order to determine an estimation deviation 3005 in an identified match between the perceptive parameter 300 of the perception data 30 and a corresponding perceptive parameter 5 in the joint world view.

Action 1007

In Action 1007, the assessment system 1 updates—e.g. with support from the parameters updating unit 107—one or more parameters of said perception model based on the estimation deviation 3005.

Action 1008

In optional Action 1008, the assessment system 1 may transmit—e.g. with support from the optional parameters transmitting unit 108—the one or more updated parameters 35 of the perception model of the PMUD 3 to a remote entity 8.

Action 1009

In optional Action 1009, the assessment system 1 may receive—e.g. with support from the optional parameters receiving unit 109—a set of globally updated parameters 85 of the perception model of the PMUD 3 from the remote entity 8, wherein the set of globally updated parameters 85 are based on information obtained from a plurality of vehicles comprising the PMUD 3.

Action 1010

In optional Action 1010, the assessment system 1 may then update—e.g. with support from the model updating unit 110—the perception model of the PMUD 3 based on the received set of globally updated parameters 85.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an assessment system for performance evaluation and updating of a Perception Module Under Development, PMUD, of an ego-vehicle equipped with an Automated Driving System, ADS, the method comprising:

obtaining world view data from an ego-vehicle perception module configured to generate the world view data based on sensor data obtained from one or more vehicle-mounted sensors;

obtaining other world view data generated by another perception module of at least a first other vehicle in a surrounding environment of the ego-vehicle;

forming a joint world view by matching the world view data and the other world view data in a common reference system;

obtaining perception data from the PMUD, the PMUD being configured to generate the perception data based on a perception model and the sensor data obtained from the one or more vehicle-mounted sensors, the perception data being indicative of a perceptive parameter of the surrounding environment of the ego-vehicle;

matching the perception data to the formed joint world view;

evaluating the obtained perception data in reference to the joint world view in order to determine an estimation deviation in an identified match between the perceptive parameter of the perception data and a corresponding perceptive parameter in the joint world view;

updating one or more parameters of the perception model based on the estimation deviation; and transmitting the one or more updated parameters of the perception model of the PMUD to a remote entity.

2. The method according to claim 1, wherein the world view data and the other world view data comprise respective data adequacy attributes indicating respective adequacy of contributing to the joint world view, the forming of the joint world view comprising forming the joint world view with the extent of contribution from the world view data and the other world view data respectively being based on the respective data adequacy attributes.

3. The method according to claim 2, wherein the obtaining other world view data comprises obtaining the other world view data from the at least first other vehicle based on the at least first other vehicle fulfilling vehicle adequacy criteria comprising conditions of under what circumstances another vehicle is deemed adequate to obtain other world view data from.

4. The method according to claim 3, further comprising:
receiving a set of globally updated parameters of the perception model of the PMUD from a remote entity, wherein the set of globally updated parameters are based on information obtained from a plurality of vehicles comprising the PMUD; and
updating the perception model of the PMUD based on the received set of globally updated parameters.

5. The method according to claim 2, further comprising:
receiving a set of globally updated parameters of the perception model of the PMUD from a remote entity, wherein the set of globally updated parameters are based on information obtained from a plurality of vehicles comprising the PMUD; and
updating the perception model of the PMUD based on the received set of globally updated parameters.

6. The method according to claim 2, wherein the perceptive parameter of the surrounding environment of the ego-vehicle comprises at least one of:
an object detection estimation;
an object classification estimation;
an object state estimation;
a road reference estimation;
a free-space estimation;
an object trajectory estimation;
a drivable-area estimation;
an object property estimation;
an ego vehicle property estimation;
an Operating Design Domain, ODD, parameter estimation;
a road segment class estimation; and
an electronic horizon estimation.

7. The method according to claim 1, wherein the obtaining other world view data comprises obtaining the other world view data from one or more other vehicles fulfilling vehicle adequacy criteria comprising conditions of under what circumstances another vehicle is deemed adequate to obtain other world view data from.

8. The method according to claim 1, wherein the perceptive parameter of the surrounding environment of the ego-vehicle comprises at least one of:
an object detection estimation;
an object classification estimation;
an object state estimation;
a road reference estimation;
a free-space estimation;
an object trajectory estimation;
a drivable-area estimation;
an object property estimation;
an ego vehicle property estimation;
an Operating Design Domain, ODD, parameter estimation;
a road segment class estimation; and
an electronic horizon estimation.

9. The method according to claim 1, further comprising:
receiving a set of globally updated parameters of the perception model of the PMUD from the remote entity, wherein the set of globally updated parameters are based on information obtained from a plurality of vehicles comprising the PMUD; and
updating the perception model of the PMUD based on the received set of globally updated parameters.

10. The method according to claim 1, further comprising:
receiving a set of globally updated parameters of the perception model of the PMUD from a remote entity, wherein the set of globally updated parameters are based on information obtained from a plurality of vehicles comprising the PMUD; and
updating the perception model of the PMUD based on the received set of globally updated parameters.

11. An assessment system for performance evaluation and updating of a Perception Module Under Development, PMUD, of an ego-vehicle equipped with an Automated Driving System, ADS, the assessment system comprising:
a world view obtaining unit configured to obtain world view data from an ego-vehicle perception module configured to generate the world view data based on sensor data obtained from one or more vehicle-mounted sensors;
an other world view obtaining unit configured to obtain other world view data generated by another perception module of at least a first other vehicle in a surrounding environment of the ego-vehicle;
a joint world view forming unit configured to form a joint world view by matching the world view data and the other world view data in a common reference system;
a PMUD data obtaining unit configured to obtain perception data from the PMUD, the PMUD being configured to generate the perception data based on a perception model and sensor data obtained from one or more vehicle-mounted sensors, the perception data being indicative of a perceptive parameter of the surrounding environment of the ego-vehicle;
a matching unit configured to match the perception data to the formed joint world view;
an estimation deviation determining unit configured to evaluate the obtained perception data in reference to the joint world view in order to determine an estimation deviation in an identified match between the perceptive parameter of the perception data and a corresponding perceptive parameter in the joint world view;
a parameter updating unit configured to update one or more parameters of the perception model based on the estimation deviation; and a parameter transmitting unit configured to transmit the one or more updated parameters of the perception model of the PMUD to a remote entity.

12. The assessment system according to claim 11, wherein the world view data and the other world view data comprise respective data adequacy attributes indicating respective adequacy of contributing to the joint world view, the joint world view forming unit being configured to form the joint world view with extent of contribution from the world view data and the other world view data respectively being based on the respective data adequacy attributes.

13. The assessment system according to claim 12, wherein the other world view obtaining unit is configured to obtain the other world view data from the at least first other vehicle based on the at least first other vehicle fulfilling vehicle adequacy criteria comprising conditions of under what circumstances an other vehicle is deemed adequate to obtain the other world view data.

14. The assessment system according to claim 11, wherein the other world view obtaining unit is configured to obtain the other world view data from the at least first other vehicle based on the at least first other vehicle fulfilling vehicle adequacy criteria comprising conditions of under what circumstances an other vehicle is deemed adequate to obtain the other world view data.

15. The assessment system according to claim 11, wherein the perceptive parameter of the surrounding environment of the ego-vehicle comprises at least one of:
   an object detection estimation;
   an object classification estimation;
   an object state estimation;
   a road reference estimation;
   a free-space estimation;
   an object trajectory estimation;
   a drivable-area estimation;
   an object property estimation;
   an ego vehicle property estimation;
   an Operating Design Domain, ODD, parameter estimation;
   a road segment class estimation; and
   an electronic horizon estimation.

16. The assessment system according to claim 11, further comprising:
   a parameter receiving unit configured to receive a set of globally updated parameters of the perception model of the PMUD from a remote entity, wherein the set of globally updated parameters are based on information obtained from a plurality of vehicles comprising the PMUD; and
   a model updating unit configured to update the perception model of the PMUD based on the received set of globally updated parameters.

17. The assessment system according to claim 11, wherein the assessment system is comprised in the ego-vehicle.

18. A computer storage medium storing a computer program containing computer program code that when executed causes one of a computer and a processor to perform a method for performance evaluation and updating of a Perception Module Under Development, PMUD, of an ego-vehicle equipped with an Automated Driving System, ADS, the method comprising:
   obtaining world view data from an ego-vehicle perception module configured to generate the world view data based on sensor data obtained from one or more vehicle-mounted sensors;
   obtaining other world view data generated by another perception module of at least a first other vehicle in a surrounding environment of the ego-vehicle;
   forming a joint world view by matching the world view data and the other world view data in a common reference system;
   obtaining perception data from the PMUD, the PMUD being configured to generate the perception data based on a perception model and sensor data obtained from one or more vehicle-mounted sensors, the perception data being indicative of a perceptive parameter of the surrounding environment of the ego-vehicle;
   matching the perception data to the formed joint world view;
   evaluating the obtained perception data in reference to the joint world view in order to determine an estimation deviation in an identified match between the perceptive parameter of the perception data and a corresponding perceptive parameter in the joint world view;
   updating one or more parameters of the perception model based on the estimation deviation; and
   transmitting the one or more updated parameters of the perception model of the PMUD to a remote entity.

* * * * *